Sept. 21, 1954  F. G. PRESNELL  2,689,585
SELF-HOLDING VALVE
Filed June 23, 1952
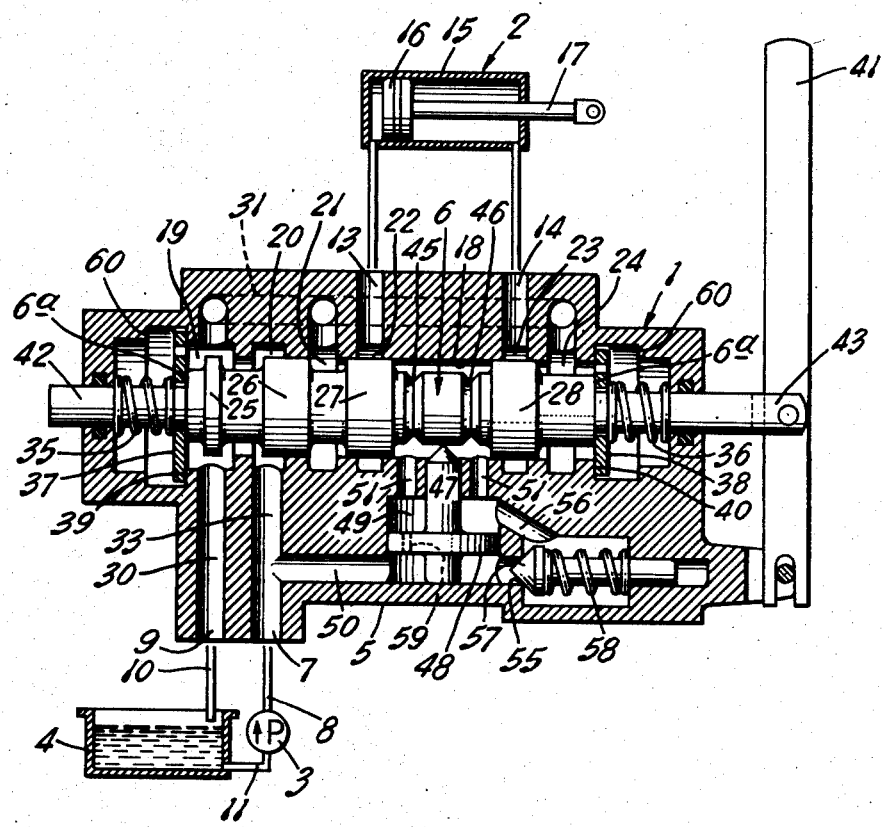
INVENTOR.
FRANK G. PRESNELL
BY
ATTORNEY Patented Sept. 21, 1954

2,689,585

UNITED STATES PATENT OFFICE 2,689,585

SELF-HOLDING VALVE

Frank G. Presnell, Hollywood, Calif., assignor to Bendix Aviation Corporation, North Hollywood, Calif., a corporation of Delaware Application June 23, 1952, Serial No. 295,058

3 Claims. (Cl. 137—622.5)

This invention relates to hydraulic power systems employing a selector valve which after being manually opened holds in open position until the motor controlled thereby completes its movement, and then automatically closes in response to resultant cessation of fluid flow through the valve.

An object of the invention is to provide a self-holding valve of simple and inexpensive construction that is reliable in operation.

Valves of the self holding type are old but previously have either been so designed that: (a) the flow of fluid through the valve created a pressure drop applied directly to the movable member of the valve to hold it open against the force of a restoring spring; or (b) the movable member was held open by a spring detent during flow and restored by the rise in line pressure at completion of the stroke of the motor, the pressure rise either acting directly against the movable valve member to overcome the detent, or disabling the detent to permit closing of the valve by a restoring spring.

The present invention resembles type (b) mentioned above in that the valve is held open by a detent against the force of a restoring spring, but it differs therefrom in that instead of the detent being disabled by the rise in line pressure at the end of the stroke, the detent is energized or activated by flow of fluid to the motor and becomes ineffective to hold the valve open against the force of the restoring spring when the flow ceases. This mode of operation is achieved by employing a piston to move the detent against the movable valve member, and energizing the piston by a pressure drop in the line fluid flowing through the valve.

Another object of invention is to provide a self holding valve used to control fluid flow to a fluid motor wherein the holding valve is held open by a detent against the force of a restoring spring, including means whereby the detent is energized or activated by flow of fluid to the motor and becomes ineffective to hold the valve open against the force of the restoring spring when fluid flow to the motor ceases.

A full understanding of the invention may be had from the following detailed description with reference to the drawing.

In the drawing, the single figure is a schematic diagram of a system employing a valve in accordance with the invention, the valve being shown in longitudinal section.

The simple system shown in the drawing comprises a hydraulic motor 2, a selector valve 1 in accordance with the invention, a pump 3, and a reservoir 4.

The valve 1 comprises a body 5 and a movable valve member 6 as its main elements. The body 5 is provided with an inlet port 7 adapted to be connected to the discharge line 8 of the pump 3 and a return port 9 adapted to be connected by a pipe 10 to the reservoir 4. The inlet of the pump is connected by a pipe 11 to the reservoir 4. The body 5 also has a pair of cylinder ports 13 and 14 respectively, which are adapted to be connected to the opposite ends of the cylinder 15 of the motor 2, the cylinder containing a piston 16 connected to a piston rod 17 which is adapted to be connected to a load to be actuated.

The body 5 defines a valve cylinder 18 in which the movable member 6 is adapted to reciprocate. The cylinder 18 is provided with a plurality of annular recesses or grooves 19, 20, 21, 22, 23 and 24 respectively, and the movable member 6 is provided with a plurality of lands 25, 26, 27 and 28 respectively.

The body recess 19 is directly connected to the return port 9 by a passage 30, and the body recess 24 is connected to the recess 19 by a passage 31. The body recess 20 is directly connected to the inlet port 7 by a passage 33. The body recess 21 is connected also to the passage 31 and thence to the return port 9. The body recess 22 is connected to the motor port 13, and the body recess 23 is connected to the motor port 14.

The movable valve member 6 is normally maintained in a central or neutral position by a pair of centering springs 35 and 36 at opposite ends thereof, each of which bears against the end wall of the valve cylinder 18 and presses against a washer 37 or 38 which is adapted to contact a shoulder 6a at each end of the movable member 6. In neutral position of the movable member 6, each of the washers 37 and 38 bears against a shoulder 39 or 40 which prevents either spring from moving the valve member 6 beyond its neutral or central position.

The right end of the movable member 6 is extended exterior of the body 5 as a rod 43 which is connected to an actuating handle 41. A similar rod 42 is extended through the left end of the body 5 to prevent pressure unbalance of the movable member 6.

In the neutral position of the movable member 6, the cylinder ports 13 and 14 are blocked by the lands 27 and 28 to prevent movement of the motor piston 16. In one active (extreme) position of the member 6, pressure fluid is applied to the port 13 and the port 14 is connected in return, while in the other active (extreme) opposite position of the member 6, pressure fluid is applied to the cylinder port 14 and the cylinder port 13 is connected to return.

To hold the valve member 6 in either active position, the member is provided with a pair of annular recesses 45 and 46 which are adapted to be engaged by a detent 47 which is secured to a piston 48 positioned in a cylinder 49 in the valve body 5. The lower end of the cylinder 49 is connected by a passage 50 to the pressure passage 33, and the upper end of the cylinder is connected by passages 51, 51 to the mid section of the valve cylinder 18. The lower end of the cylinder 49 is also connected through a valve seat 55 and a passage 56 with the upper end of the cylinder 49. Cooperating with the seat 55 is a poppet 57 which is urged against the seat by a helical compression spring 58. A bleed passage 59 is provided in the piston 48.

The structure described functions as follows:

Normally the fluid delivered by the pump 3 flows through the inlet port 7, the passage 33, the annular recess 20, the annular recess 19 and the passage 30 back through the outlet port 9 to the reservoir 4, and no pressure is developed.

If the motor piston 16 is to be moved to the right end of its stroke the operating handle 41 is swung to the left to move the movable valve member 6 into its extreme leftmost position in which the washer 37 abuts against a shoulder 60, and the detent 47 is juxtaposed to the annular recess 46. In this position the valve land 26 closes the ends of the body recess 20, preventing bypass of fluid from the pump, and the fluid is therefore forced through the passage 50, through the lower end of the cylinder 49, the valve seat 55 (opening of the poppet 57), through the passage 56 and the upper end of the cylinder 49 and the passages 51 into the central portion of the valve cylinder 18, and thence into the body recess 22 and through the cylinder port 13 to the left end of the motor cylinder 15. At the same time, the right end of the motor cylinder is connected through the port 14 and the body recesses 23 and 24, the passage 31, the body recess 19, and the return passage 30, so that the motor piston 16 is moved from left to right.

As previously indicated, the check valve consisting of the poppet 57 creates a predetermined pressure drop between the lower end of the cylinder 49 and the upper end thereof. This pressure drop acts against the piston 48 to urge the detent 47 into engagement with the recess 46 with sufficient force to hold the valve in active position against the force of the restoring spring 35, so that the handle 41 can be released. It will be observed that movement of the member 6 to the left compresses the centering spring 35, and releases the member from the effect of the spring 36 since the latter is prevented from following up the valve by engagement of the washer 38 against the shoulder 40.

When the motor piston 16 completes its stroke, it blocks further flow of fluid through the path described. The check valve 57 therefore seats, and any pressure existent in the lower end of the cylinder 49 is dissipated through the bleed hole 59. The detent 47 is therefore no longer capable of holding the movable member 6, and it is restored to neutral position by the centering spring 35.

When the motor piston 16 is to be moved to the left, the handle 41 is swung to the right to move the valve member 6 into its right active position in which the annular groove 45 is juxtaposed to the detent 47. In this position the land 25 blocks flow from the pressure passage 33 to the return passage 30, and pressure fluid flows from the passage 33 through the passage 50, the lower end of the cylinder 49, past the check valve 57, and through the passage 56, the upper end of the cylinder 49, the passages 51, the center portion of the valve cylinder 18, the body recess 23, and the cylinder port 14 to the right end of the motor cylinder 15. At the same time, the left end of the motor cylinder is connected through the cylinder port 13, the recess 21, the passage 31, the body recess 19, and the return passage 30, so that the motor piston 16 moves from right to left. During this movement the valve is held in active position by engagement of the detent 47 with the groove 45 in the movable member 6, so long as flow continues. However, when the motor piston 16 reaches the end of its stroke and blocks flow through the valve the pressure differential across the detent piston 48 disappears and the detent releases the valve member 6 to permit its restoration by the centering spring 36 into neutral position.

An important advantage of the present construction over valves in which the centering spring is overcome by a pressure force acting against the end of the movable member, is that the holding force produced by the detent 47 is independent of the area of the end of the movable member.

In some systems, the motor piston 16 may be single acting, i. e. it may be constantly urged to the left, for instance, by the load connected thereto, so that it is only necessary to apply pressure fluid to and release it from the left end of the cylinder 15. In such a system the right end of the cylinder 15 can be vented to atmosphere, and the valve 1 can be simplified by eliminating the recess 23 and the recess 24.

Although for the purpose of explaining the invention, a particular embodiment thereof has been shown and described, obvious modifications will occur to a person skilled in the art, and I do not desire to be limited to the exact details shown and described.

I claim:

1. A self holding valve comprising: a body member having an inlet port and a cylinder port; a movable member in said body member movable between neutral and active positions respectively, and means for moving it; said members having cooperating passages for connecting said inlet port to said cylinder port in said active position and isolating it from said cylinder port in said neutral position; spring means urging said movable member from said active to said neutral position; a brake element laterally movable in said body member into engagement with said movable member for engaging the latter and resisting movement thereof; piston means responsive to a pressure drop thereacross for urging said brake element against said movable member; said passage means for connecting said inlet port to said cylinder port in said active position of said movable member including means responsive to flow therethrough for producing a pressure drop across said piston means.

2. A valve according to claim 1 in which said braking element comprises a detent and said movable member has a recess positioned to be engaged by said detent when said movable member is in its said active position.

3. A valve according to claim 1 in which said means for producing a pressure drop comprises a check valve consisting of a valve seat, a poppet opening away from said seat in the direction of fluid flow, and a spring urging said poppet toward said seat.

References Cited in the file of this patent

UNITED STATES PATENTS

| Number | Name | Date |
|---|---|---|
| 2,357,169 | Budd | Aug. 29, 1944 |
| 2,368,852 | Lauck | Feb. 6, 1945 |
| 2,536,141 | Rockwell | Jan. 2, 1951 |